(12) United States Patent
Gansley et al.

(10) Patent No.: US 9,650,269 B2
(45) Date of Patent: May 16, 2017

(54) SYSTEM AND METHOD FOR REDUCING GAS EMISSIONS FROM WET FLUE GAS DESULFURIZATION WASTE WATER

(71) Applicant: ALSTOM Technology Ltd, Baden (CH)

(72) Inventors: Raymond Raulfs Gansley, Knoxville, TN (US); Philip C. Rader, Knoxville, TN (US)

(73) Assignee: General Electric Technology GmbH, Baden (CH)

( * ) Notice: Subject to any disclaimer, the term of this patent is extended or adjusted under 35 U.S.C. 154(b) by 228 days.

(21) Appl. No.: 14/552,931

(22) Filed: Nov. 25, 2014

(65) Prior Publication Data

US 2016/0145127 A1 May 26, 2016

(51) Int. Cl.
| | |
|---|---|
| *C02F 1/68* | (2006.01) |
| *C02F 1/20* | (2006.01) |
| *B01D 19/00* | (2006.01) |
| *B01D 53/50* | (2006.01) |
| *B01D 53/56* | (2006.01) |
| *B01D 53/86* | (2006.01) |

(Continued)

(52) U.S. Cl.
CPC ............ *C02F 1/68* (2013.01); *B01D 19/0068* (2013.01); *B01D 53/50* (2013.01); *B01D 53/56* (2013.01); *B01D 53/8625* (2013.01); *B01D 53/96* (2013.01); *C02F 1/20* (2013.01); *B01D 2251/206* (2013.01); *B01D 2251/2062* (2013.01); *C02F 2101/16* (2013.01); *C02F 2201/002* (2013.01); *C02F 2303/16* (2013.01); *Y02E 20/12* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,069,886 | A | * | 12/1991 | Frey | .......................... C01C 1/12 422/148 |
| 5,387,407 | A | * | 2/1995 | Ruegg | ....................... C01C 1/12 423/235 |

(Continued)

FOREIGN PATENT DOCUMENTS

| | | |
|---|---|---|
| DE | 3429999 A1 | 2/1986 |
| DE | 4218300 A1 | 12/1993 |

(Continued)

OTHER PUBLICATIONS

European Search Report and Opinion issued in connection with corresponding EP Application No. 15195890.7 on Apr. 25, 2016.

*Primary Examiner* — Amber R Orlando
*Assistant Examiner* — Phillip Shao
(74) *Attorney, Agent, or Firm* — GE Global Patent Operation; Rita D. Vacca

(57) ABSTRACT

A method and a system (12) for reducing plant (10) gas emissions by reducing ammonia/ammonium ion content in waste water W prior to the waste water W being evaporated in an evaporator device (7). As such, the method and the system (12) reduce the release of ammonia/ammonium ion into the flue gas FG stream thus reducing emissions of ammonia/ammonium ions to the environment or atmosphere and/or accumulation of ammonia/ammonium ions in downstream equipment such as a wet flue gas desulfurization system (13).

8 Claims, 2 Drawing Sheets

(51) Int. Cl.
*B01D 53/96* (2006.01)
*C02F 101/16* (2006.01)

(56) References Cited

U.S. PATENT DOCUMENTS

| | | | |
|---|---|---|---|
| 6,076,369 | A | 6/2000 | Ochi et al. |
| 7,524,470 | B2 | 4/2009 | Barger et al. |
| 7,625,537 | B2 | 12/2009 | Rader et al. |
| 8,388,917 | B2 | 3/2013 | Ukai et al. |
| 8,475,850 | B2 | 7/2013 | Tripp et al. |
| 2009/0294377 | A1 | 12/2009 | Gallot |
| 2010/0089740 | A1* | 4/2010 | Vuong .................... C02F 1/042 203/10 |
| 2011/0262331 | A1 | 10/2011 | Ukai et al. |
| 2012/0240761 | A1 | 9/2012 | Ukai et al. |
| 2013/0220792 | A1 | 8/2013 | Ungerer et al. |
| 2013/0248121 | A1 | 9/2013 | Ukai et al. |
| 2014/0105800 | A1* | 4/2014 | Handagama ....... B01D 53/1475 423/220 |

FOREIGN PATENT DOCUMENTS

| | | |
|---|---|---|
| EP | 0264041 A2 | 4/1988 |
| EP | 1 955 755 A2 | 8/2008 |
| JP | 2012200721 A | 10/2012 |
| WO | 9002600 A1 | 3/1990 |
| WO | 2006/030398 A1 | 3/2006 |

* cited by examiner

SYSTEM AND METHOD FOR REDUCING GAS EMISSIONS FROM WET FLUE GAS DESULFURIZATION WASTE WATER

TECHNICAL FIELD

The present disclosure relates to a system and method for reducing gas emissions from wet flue gas desulfurization waste water, and more specifically, to a system and method for reducing ammonia/ammonium ion present in wet flue gas desulfurization waste water prior to evaporation of the waste water in an evaporation device thereby reducing or eliminating the ammonia/ammonium ion from environmental release and/or system accumulation.

BACKGROUND

Utility and industrial plants are subject to increasingly strict limits with respect to air emissions and waste water discharge. Compliance with government regulations add significantly to the capital and operating costs of utility and industrial plants powered by fossil fuels. Traditionally, compliance with air emission limits was achieved through the use of wet flue gas desulfurization (WFGD) or dry flue gas desulfurization (DFGD) systems. The capital cost of such systems and the associated Balance of Plant (BOP) systems add significantly to the overall cost of power generation. BOP systems include for example associated ductwork, fans, bulk material handling systems, and like associated plant equipment and systems. BOP systems typically costs 200 to 500 US Dollars/kilowatt ($/kW). In retrofit situations, the capital cost associated with environmental compliance may render a plant uneconomical. In addition to capital investment, WFGD and DFGD systems also involve substantial operating costs associated with reagent consumption, auxiliary power usage, operation staffing and maintenance staffing.

Compliance with current waste water discharge limits are achieved in a variety of ways, which may be as simple as combination/dilution of multiple plant waste water streams into a single compliant stream, or as complicated as waste water treatment systems involving neutralization, precipitation of heavy metals, biological treatment, filtration, and/or similar such treatment steps. Examples of flue gas cleaning systems and/or waste water treatment systems can be appreciated from International Publication No. WO 2006030398, U.S. Patent Application Publication Nos. 2009/0294377, 2011/0262331, 2012/0240761, 2013/0248121, and 2013/0220792, U.S. Pat. Nos. 6,076,369, 7,524,470, 7,625,537, 8,388,917, and 8,475,750, European Patent Publication No. EP 1 955 755, and Japanese Published Patent Application No. JP 2012200721.

With increasingly strict limits being established with regard to air emissions and waste water discharge, efficient and economical systems and methods for reducing gas emissions from WFGD waste water streams are needed.

SUMMARY

According to aspects illustrated herein, there is provided a method for reducing gas emissions comprising at least the steps of contacting a waste water holding tank containing waste water with steam, air, or steam and air as a stripping agent to induce waste water ammonia stripping therein to produce a stripped ammonia stream, and causing the stripped ammonia stream to flow from the waste water holding tank to a flow upstream of a combustion unit, to a combustion unit directly, to a flow upstream of a nitrogen oxide removing device, and/or to a nitrogen oxide removing device directly to reduce or prevent emissions of ammonia/ammonium ions to the environment or atmosphere and/or accumulation thereof in downstream equipment, such as a wet flue gas desulfurization (WFGD) system.

According to other aspects illustrated herein, there is provided a system for reducing gas emissions comprising a waste water holding tank operable to contain waste water and to receive steam, air, or steam and air as a stripping agent to induce ammonia stripping of the waste water to produce a stripped ammonia stream, and ductwork for stripped ammonia stream flow from the waste water holding tank to a flow upstream of a combustion unit, to a combustion unit directly, to a flow upstream of a nitrogen oxide removing device, and/or to a nitrogen oxide removing device directly to reduce or prevent emissions of ammonia/ammonium ions to the environment or atmosphere and/or accumulation thereof in downstream equipment, such as a WFGD system. A secondary benefit of reducing ammonia consumption in the nitrogen oxide removing device is also achieved.

In summary, a method is provided for reducing plant gas emissions to the environment, comprising contacting waste water from a flue gas treatment system of the plant with steam, air, or steam and air to produce a stripped ammonia gas from the waste water, and causing a flow of the stripped ammonia gas to a flow upstream of a combustion unit, to the combustion unit, to a flow upstream of a nitrogen oxide removing device, or to the nitrogen oxide removing device for reaction of the stripped ammonia gas reducing environmental emission thereof. A secondary benefit of reducing ammonia consumption in the nitrogen oxide removing device is also achieved. According to this method the waste water comprises ammonia, ammonium ions or a combination of ammonia and ammonium ions and the steam. Also according to this method, the combustion unit is an incinerator or a boiler, the nitrogen oxide removing device is a selective catalytic removal device or a selective non-catalytic removal device, the plant is a power plant or an industrial plant, and the flue gas treatment system is a wet flue gas desulfurization system.

In summary, a system is provided for reducing plant gas emissions to the environment, comprising a waste water holding tank containing waste water comprising ammonia/ammonium ions from a plant flue gas treatment system for temporary storage, a steam/air source operable to supply steam, air, or steam and air to the waste water in the waste water holding tank to produce a stripped ammonia gas from the waste water, and ductwork arranged for flow of the stripped ammonia gas to a flow upstream of a combustion unit, to the combustion unit, to a flow upstream of a nitrogen oxide removing device, or to the nitrogen oxide removing device for reaction of the stripped ammonia gas in the combustion unit or the nitrogen oxide removing device reducing environmental emission thereof. According to the subject system, the flow upstream of the combustion unit is an air flow and the flow upstream of the nitrogen oxide removing device is a flue gas flow. Also according the subject system, the combustion unit is an incinerator or a boiler, the nitrogen oxide removing device is a selective catalytic removal device or a selective non-catalytic removal device, the plant is a power plant or an industrial plant, the flue gas treatment system is a wet flue gas desulfurization system, and the waste water holding tank releases after stripping ammonia gas, a flow of waste water to an evaporator device for waste water evaporation.

The above described methods and systems, as well as other features are exemplified by the following figures and detailed description.

BRIEF DESCRIPTION OF THE DRAWINGS

Referring now to the figures, which illustrate exemplary embodiments where like elements are indicated with like reference numbers and/or letters.

Other details, objects, and advantages of the subject systems and methods disclosed herein will become apparent from the following description of exemplary embodiments and associated exemplary methods.

DETAILED DESCRIPTION

Figure 1:
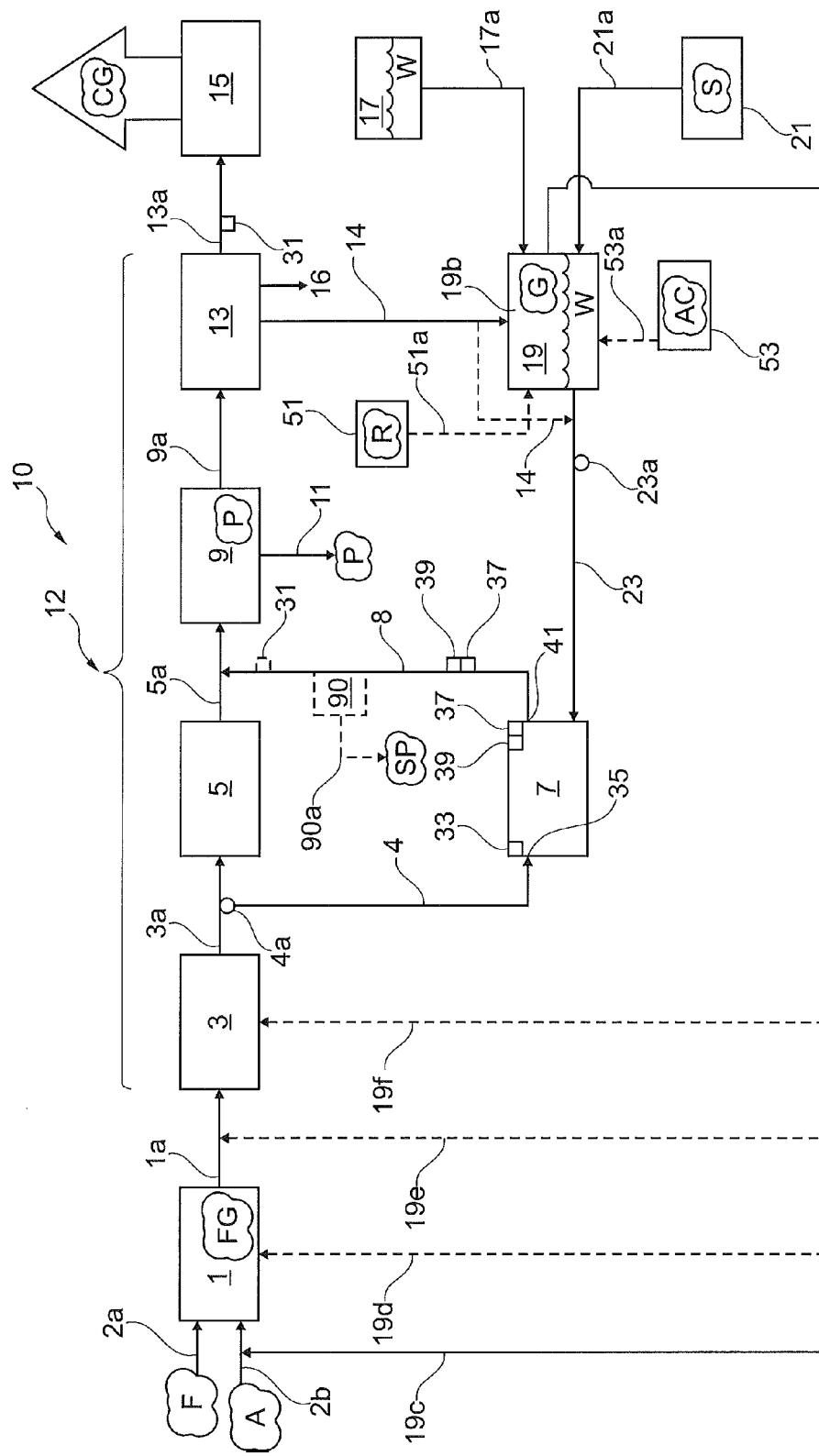
FIG. 1 is a block diagram of a first exemplary embodiment of a system for reducing gas emissions.

As best illustrated in FIG. 1 is a power, utility or industrial plant 10, a system 12 for reducing gas emissions, and a method of practicing the same to reduce or prevent ammonia/ammonium ion emissions to the environment or atmosphere. Embodiments of the system 12 for reducing gas emissions can be utilized in power plants, utility plants, and industrial plants.

As illustrated, plant 10 includes a combustion unit 1, such as a gas turbine, an incinerator, or a boiler, that combusts a fuel F thereby producing steam and/or a hot flue gas FG. The combustion unit 1 can be fed at least one oxygen containing gas flow A, e.g., an oxidant flow such as air, $O_2$ gas, or another type of gas containing $O_2$ gas, via duct 2b, and fed a fuel F via duct 2a for combustion of the fuel F in combustion unit 1. The fuel F can be a fossil fuel such as coal, oil, or natural gas, and can also be other fuels including biowastes or municipal wastes. In addition to steam, hot flue gas FG is formed via combustion of the fuel F, which flows from combustion unit 1 via duct 1a. The steam can be transported to a turbine (not shown) for use in generating electricity or put to other uses, e.g., district heating, process heating, etc. The hot flue gas FG can be transported to other system 12 components for use of the flue gas' FG heat prior to release of at least a portion of the flue gas FG to the environment or atmosphere.

Duct 1a is fluidly connected between the combustion unit 1 and a nitrogen oxide removing device 3 for flue gas FG flow from the combustion unit 1 to the nitrogen oxide removing device 3. The nitrogen oxide removing device 3 can be configured as a selective catalytic reduction (SCR) unit, a selective non-catalytic reduction (SNCR) unit, or another type of element configured to remove nitrogen oxides (e.g. $NO_2$, $NO_3$, $NO_R$) from the flue gas FG.

After the flue gas FG flows through the nitrogen oxide removing device 3, the flue gas FG flows via fluidly connected duct 3a to a fluidly connected preheater 5 for further processing or use. The flue gas FG flowing through pre-heater 5 heats a circulated fluid (not shown) flowing through the pre-heater 5 prior to the circulated fluid's flow to the combustion unit 1. From pre-heater 5, the flue gas FG flows through fluidly connected duct 5a to a particulate collector 9. However, a portion of flue gas FG flowing through duct 3a flows through fluidly connected duct 4, to a fluidly connected evaporator device 7 thereby bypassing pre-heater 5. The portion of the flue gas FG supplied to the evaporator device 7 can be considered a "slipstream" in some embodiments of the system 12.

The evaporator device 7 is a vessel sized to receive flue gas FG via duct 4 and liquid waste water W from a waste water holding tank 19 via fluidly connected pipe 23. The waste water holding tank 19 is operative to receive liquid waste water W from one or more sources 17 of a plant 10 via a fluidly connected pipe 17a and to retain that waste water W for supply to the evaporator device 7 at a pre-specified flow rate or at a controlled flow rate as described in more detail below.

Further, steam, air, or steam and air S is supplied from a steam/air source 21 to the waste water holding tank 19 via a duct 21a fluidly connected therebetween. Steam, air, or steam and air S supplied as a stripping agent to waste water holding tank 19 via duct 21a induces stripping of ammonia from the waste water W into an upper portion or head space 19b of waste water holding tank 19. Stripped ammonia gas G in head space 19b flows from waste water holding tank 19 via duct 19a to duct 19c fluidly connected to duct 2b for flow into combustion unit 1, and/or to duct 19d fluidly connected for flow directly into combustion unit 1, and/or to duct 19e fluidly connected to duct 1a for flow into nitrogen oxide removing device 3, and/or to duct 19f fluidly connected for flow directly into nitrogen oxide removing device 3. As such, stripped ammonia gas G that flows via duct 19c and/or 19d to combustion unit 1, or that flows via duct 19e and/or 19f to nitrogen oxide removing device 3 removes stripped ammonia gas G from the system 12 prior to waste water W flow to evaporator device 7 thereby reducing or preventing ammonia/ammonium ion emissions to the environment or atmosphere.

The evaporator device 7, fed waste water W from waste water holding tank 19 via pipe 23, can be configured as a spray dryer absorber (SDA) or other device or vessel capable of directly contacting a waste water W stream with flue gas FG in such a way as to cool the flue gas FG to a reduced temperature and increase the humidity level of the flue gas FG by evaporating the waste water W. The evaporator device 7 can include a rotary atomizer, a dual fluid nozzle, or other dispersion element to spray or otherwise disperse the waste water W into the flue gas FG for cooling and humidifying the flue gas FG and evaporating the waste water W.

Diversion of a portion of flue gas FG emitted by the combustion unit 1 from pre-heater 5 for flow to the evaporator device 7 can permit relatively hot flue gas FG, e.g., flue gas having a temperature of about 700° F., 370° C., between about 600° F. and about 800° F., or between about 300° C. and about 450° C., to flow to the evaporator device 7. The above temperature ranges are representative of a steam producing power plant 10 application. Other industrial or gas fired applications may have different temperature ranges. The use of such relatively hot flue gas FG in the evaporator device 7 achieves evaporation of a relatively larger amount of waste water W as compared to using relatively cooler flue gas FG that has previously been used in other heat transfer operations, e.g., after the flue gas FG has passed through the pre-heater 5. The relatively higher flue gas FG temperature obtained by diverting flue gas FG flow from pre-heater 5 to evaporator device 7, also allows for evaporator device 7 fabrication at a lower cost. Lower cost fabrication is possible using the subject system 12 and method as the necessary size of the evaporator device 7 may be smaller for evaporation of a set amount of waste water W when using a relatively hotter flue gas FG for the evaporation, as compared to other embodiments using relatively cooler flue gas FG for the evaporation. In addition to lower fabrication costs, the use of a smaller evaporator device 7 can permit the evaporator device 7, duct 4, and output duct 8 to occupy a smaller footprint, which is oftentimes advantageous for retrofitting systems 12 within plants 10 with relatively little space availability.

Use of the relatively hot flue gas FG from upstream of pre-heater 5 has an additional advantage in that the flue gas FG pressure from this upstream location is higher than the flue gas FG pressure downstream of the pre-heater 5. Higher flue gas FG pressure can facilitate a natural circulation of the flue gas FG passed through duct 4 for flow into the evaporator device 7 and out of evaporator device 7 via fluidly connected duct 8. Such natural circulation is beneficial as thereby a pump or fan 31 is not needed for powering the flow of flue gas FG to or from the evaporator device 7. Of course, a pump or fan 31 can be utilized in duct 8 of such systems 12 as a back-up measure or to ensure control of flue gas FG flow rate is maintainable within a desired flow rate range. When a pump or fan 31 is used in such systems 12, the pump or fan may be able to operate at lower power levels thereby conserving energy and associated costs due to the larger pressure drop provided by use of the relatively hotter flue gas FG.

The flow rate of flue gas FG entering the evaporator device 7, the temperature of the flue gas FG, and/or the humidity of the flue gas FG exiting the evaporator device 7 can be monitored via at least one flow sensor 33 adjacent to the inlet 35 of the evaporator device 7, at least one temperature sensor 37, and/or at least one humidity sensor 39 positioned adjacent the outlet 41 of the evaporator device 7 or positioned within duct 8 of the evaporator device 7 to control operations of the evaporator device 7 to ensure that the flue gas FG is cooled to at least a pre-specified temperature and has a pre-specified level of humidity. The flow rate of flue gas FG passing through duct 4 and/or waste water W fed to the evaporator device 7 can be adjusted based upon the flow rate, temperature, and humidity level of the flue gas FG detected by the one or more sensors 33, 37, 39. Alternatively, the flue gas FG flow rate can be maintained while the waste water W flow is controlled to achieve the desired temperature and humidity conditions of the flue gas FG.

For example, the flue gas FG can be monitored to maintain the flue gas FG within duct 8 at a pre-specified temperature range such as at a temperature of between about 180° F. and about 400° F. or at a temperature of between about 80° C. and about 205° C. As another example, the temperature of the flue gas FG within the evaporator device 7 and/or within duct 8 can be monitored to ensure that the flue gas FG is at least about 10° C. or about 20° F. above its adiabatic saturation temperature to avoid wetting of the solid particulates and/or corrosion. In the event the flue gas FG is determined to be below a pre-specified temperature threshold, a larger amount of flue gas FG controlled by a control valve 4a may be diverted into duct 4 for flow into evaporator device 7 and/or the amount of waste water W being fed to the evaporator device 7 controlled by a control valve 23a, may be decreased so that less waste water W contacts the flue gas FG. In the event the flue gas FG is determined to be above a pre-specified temperature threshold, more waste water W controlled by a control valve 23a may be fed to the evaporator device 7 and/or less flue gas FG controlled by a control valve 4a may be diverted through duct 4 to the evaporator device 7.

The waste water W fed to the evaporator device 7, which has already had ammonia/ammonium ions removed therefrom, can include solid material such as solid particulates that are suspended within the waste water W. The waste water W can also include elements that can precipitate out of the waste water W as the liquid waste water W is heated and subsequently evaporated in the evaporator device 7. When solids are present within the waste water W, the solids can improve drying operations.

In an exemplary embodiment that can be preferred for at least some applications, solid material is added to the waste water W to facilitate evaporation of the waste water W and drying of dissolved and suspended solids thus avoiding deposition of moist particles in downstream ducts/pipes and vessels. For instance, solid particulates from the particulate collector 9 or a solid byproduct from a flue gas desulfurization (FGD) system can be fed to the waste water holding tank 19 or mixed with the waste water W therein to add solid particulates to the stored waste water W. The mixing of the solid particulates within the waste water W may occur in the waste water holding tank 19, or prior to the waste water W being fed to the evaporator device 7.

The liquid waste water W can also include other elements that are mixed or added therein. For example, a material containing an alkaline reagent R such as lime, hydrated lime, sodium carbonate, trona, or alkaline fly ash can be added to the waste water W. An alkaline reagent source 51 such as a container retaining such material can be fluidly connected via a duct 51a to waste water holding tank 19 for feeding the alkaline reagent R to the waste water W while it is retained in the waste water holding tank 19.

A pre-specified amount of alkaline reagent R can be fed to the waste water W so that waste water W is alkaline rich and is in excess of what is required to precipitate insoluble and heavy metal compounds when the waste water W is evaporated via contact with the flue gas FG in the evaporator device 7. The addition of alkaline reagent R to raise the pH of the contents of the waste water holding tank 19 to preferably about 12.0 or higher improves the stripping of ammonia. The presence of excess amounts of the alkaline reagent R within the waste water W can also help prevent corrosion and reduce pollutant emissions by capturing acid gas elements within the flue gas FG such as hydrogen chloride (HCl), hydrogen fluoride (HF), sulfur dioxide ($SO_2$), sulfur trioxide ($SO_3$), and sulfuric acid ($H_2SO_4$), and by forming solid particulates such as calcium sulfite ($CaSO_3$), calcium sulfate ($CaSO_4$), calcium chloride ($CaCl_2$), and calcium fluoride ($CaF_2$). Additionally, any unreacted alkaline reagent R within the solids can provide a sorbent that continues to react within the flue gas FG to continue to capture additional acid gas elements as the flue gas FG flows from evaporator device 7 through duct 8 to mix with cooled and humidified flue gas FG and solid particulates flowing from pre-heater 5 via fluidly connected duct 5a. The presence of such sorbent elements can help prevent corrosion of downstream equipment by capturing acidic elements within the flue gas FG and provide additional sorbent for downstream collection of acid gas related elements to prevent the emission of such elements into the atmosphere.

In embodiments where a wet flue gas desulfurization system 13 is located downstream of the evaporator device 7, the capture of HCl in the flue gas FG upstream using the alkaline reagent R, can reduce the amount of purge waste water W. In such embodiments, the size of the evaporator device 7 can therefore be reduced as a relatively smaller amount of flue gas FG would be required to evaporate the relatively smaller amount waste water W.

In addition, activated carbon or activated coke AC from an activated carbon or activated coke source 53 can be added to the waste water holding tank 19 via a fluidly connected duct 53a to add activated carbon or activated coke AC to the liquid waste water W prior to the waste water W being fed to the evaporator device 7. The presence of the activated carbon or activated coke AC can result in the adsorption of compounds of metal such as mercury, selenium and arsenic and can suppress the potential to evaporate such compounds when the waste water W is evaporated in the evaporator device 7. Additionally, the presence of the activated carbon or activated coke AC in the liquid waste water W can result in the adsorption of metal compounds (e.g. mercury) that may be present in the flue gas FG passed through the evaporator device 7.

In some embodiments, the activated carbon or activated coke AC can be mixed with the alkaline reagent R prior to feeding the material to the waste water holding tank 19. In other embodiments, the activated coke or activated carbon AC can be kept separate from the alkaline reagent R and can be separately added to the waste water W.

The first portion of the flue gas FG flowing from evaporator device 7 through duct 8 and into duct 5a combines with the second portion of the flue gas FG flowing from pre-heater 5 through duct 5a, prior to the combined flue gas FG flowing into fluidly connected particulate collector 9. Alternatively, the particulate collector 9 may fluidly connect directly to each the evaporator device 7 and the pre-heater 5 via separate fluidly connected ducts for receiving separately both the first and the second portions of flue gas FG within the particulate collector 9. The particulate collector 9 can be configured as a precipitator such as an electrostatic precipitator, or a filter such as a fabric filter. The particulate collector 9 can alternatively be configured as another type of particulate collector that is configured to separate solid particulates from the flue gas FG and/or precipitate solid particulates out of the flue gas FG for separating those solids P from the flue gas FG. Alternatively, a separate particulate collector 90 can be configured downstream of the evaporator device 7 for separate and segregated particulate SP capture and disposal via duct 90a. In this scenario, a fan 31 may be included following particulate collector 90 with flue gas flowing therefrom in duct 8 combined with flue gas flowing through duct 5a.

The separated flue gas FG flows from particulate collector 9 via a fluidly connected duct 9a to a fluidly connected wet flue gas desulfurization system 13. Within the wet flue gas desulfurization system 13 sulfur is removed from the flue gas FG prior to the flue gas FG flowing via fluidly connected duct 13a to a fluidly connected stack 15 such as a chimney or heat recovery steam generator for expelling the "cleaned" flue gas CG to the atmosphere. In alternative embodiments, a dry flue gas desulfurization system can be utilized instead of a wet flue gas desulfurization system.

Waste water W from the wet flue gas desulfurization system 13 can be fed via fluidly connected pipe 14 to the fluidly connected waste water holding tank 19. Additionally, waste water W from another source 17, such as from a reaction tank, a primary hydrocyclone overflow, and/or a vacuum filtrate, can be fed via a fluidly connected pipe 17a to the waste water holding tank 19. Other waste water W sources such as from cooling tower blowdown, storm and coal pile run-off, chemical cleaning waste, and/or ash pond overflow of a power plant can be collected or otherwise transported to the waste water holding tank 19 to be retained therein. It is also contemplated that a source of waste water W can be from another industrial party that is a customer of the operator of the plant 10 who transports "customer" waste water W to plant 10 for treatment of the "customer" waste water W.

The solids P from the particulate collector 9 separated from the flue gas FG can include solid material produced during the original combustion of fossil fuel F in the combustion unit 1 and entrained within the so produced flue gas FG. Additionally, solids P from the particulate collector 9 separated from the flue gas FG, may include solids formed from waste water W contact with the flue gas FG to cool and humidify the flue gas FG, precipitates of the flue gas that can be formed and/or particulates entrained in the flue gas, such as fly ash. The solids P separated from the flue gas FG by the particulate collector 9 can be transported for storage, treatment or other distribution via fluidly connected duct 11.

Figure 2:
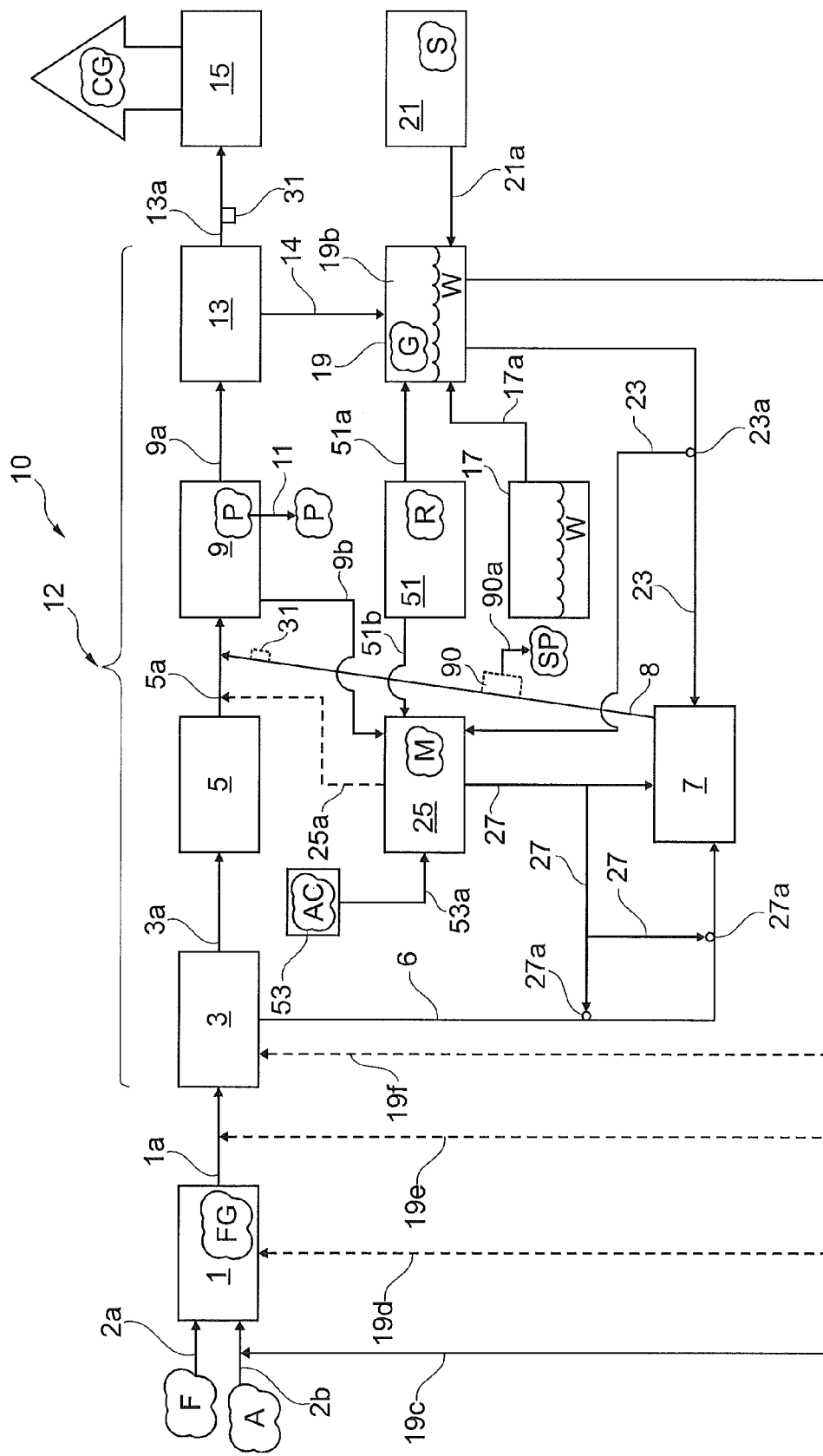
FIG. 2 is a block diagram of a second exemplary embodiment of a system for reducing gas emissions.

In an alternative embodiment, the waste water W can be fed to a mixer device 25 for mixing with an alkaline reagent R, activated coke or activated carbon AC, and at least a portion of the solids P separated by the particulate collector 9. FIG. 2 illustrates such an alternative embodiment. Like features of the system and method of FIG. 2 to those of the system and method of FIG. 1 are identified with like reference numbers and/or letters for purposes of simplicity and clarity, and to avoid requiring redundancy of the description thereof.

As illustrated in FIG. 2, flue gas FG flowing from combustion unit 1 flows through a nitrogen oxide removing device 3 to remove nitrogen oxide components from the flue gas FG, with a portion of the flue gas FG then flowing into duct 6 to bypass a pre-heater 5. Waste water W from a wet flue gas desulfurization system 13 via pipe 14 and at least one other waste water source 17 via pipe 17a can be temporarily retained in a waste water holding tank 19. As such, the waste water holding tank 19 is arranged to receive liquid waste water W from wet flue gas desulfurization system 13 and one or more sources 17 of a plant 10 via a fluidly connected pipes 14 and 17a, respectively, and retain that waste water W for supplying the waste water W to the evaporator device 7 at a pre-specified flow rate or at a controlled flow rate controlled by a control valve 23a. The liquid waste water W can also include other elements that are mixed or added therein. For example, a material containing an alkaline reagent R such as lime, hydrated lime, sodium carbonate, trona, or alkaline fly ash can be added to the waste water W. Alkaline reagent source 51 such as a container retaining such material can be fluidly connected via a duct 51a to waste water holding tank 19 for feeding the alkaline reagent R to the waste water W while it is retained in the waste water holding tank 19. As such, a pre-specified amount of alkaline reagent R can be fed to the waste water W so that waste water W is alkaline rich and is in excess of what is required to precipitate insoluble and heavy metal compounds when the waste water W is evaporated via contact with the flue gas FG in the evaporator device 7. The addition of alkaline reagent R to raise the pH of the contents of the waste water holding tank 19 to preferably about 12.0 or higher improves the stripping of ammonia. The presence of excess amounts of the alkaline reagent R within the waste water W can also help prevent corrosion and reduce pollutant emissions by capturing acid gas elements within the flue gas FG such as hydrogen chloride (HCl), hydrogen fluoride (HF), sulfur dioxide ($SO_2$), sulfur trioxide ($SO_3$), and sulfuric acid ($H_2SO_4$), and by forming solid particulates such as calcium sulfite ($CaSO_3$), calcium sulfate ($CaSO_4$), calcium chloride ($CaCl_2$), and calcium fluoride ($CaF_2$). Additionally, any unreacted alkaline reagent R within the solids can provide a sorbent that continues to react within the flue gas FG to continue to capture additional acid gas elements as the flue gas FG flows from evaporator device 7 through duct 8 to mix with cooled and humidified flue gas FG and solid particulates flowing from pre-heater 5 via fluidly connected duct 5a. The presence of such sorbent elements can help prevent corrosion of downstream equipment by capturing acidic elements within the flue gas FG and provide additional sorbent for downstream collection of acid gas related elements to prevent the emission of such elements into the atmosphere. Further, steam, air, or steam and air S is supplied from a steam/air source 21 to the waste water holding tank 19 via a duct 21a fluidly connected therebetween. Steam, air, or steam and air S supplied as a stripping agent to waste water holding tank 19 via duct 21a induces stripping of ammonia from the waste water W into the upper portion or head space 19b of waste water holding tank 19. Stripped ammonia gas G in head space 19b flows from waste water holding tank 19 via duct 19a to duct 19c fluidly connected to duct 2b for flow into combustion unit 1, and/or to duct 19d fluidly connected for flow directly into combustion unit 1, and/or to duct 19e fluidly connected to duct 1a for flow into nitrogen oxide removing device 3 and/or to duct 19f fluidly connected for flow directly into nitrogen oxide removing device 3. As such, stripped ammonia gas G that flows via duct 19c and/or 19d to combustion unit 1, and/or that flows via duct 19e and/or 19f to nitrogen oxide removing device 3 removes stripped ammonia gas G from the system 12 thereby reducing or preventing gas emissions to the environment or atmosphere. After stripping the ammonia gas G from the waste water W in waste water holding tank 19, waste water W flows under control of control valve 23a through pipe 23 to a mixer device 25 for mixing with an alkaline reagent R fed to the mixer device 25 via fluidly a connected duct 51b fluidly connected to an alkaline reagent source 51. For such embodiments, it is contemplated that the mixer device 25 is configured as a mixer of a NID™ dry flue gas desulfurization system available from ALSTOM Power, Inc., Paris, France. Of course, other types of mixer devices 25 can alternatively be used.

Activated carbon or activated coke AC is also supplied from an activated carbon or activated coke AC source 53 via a fluidly connected duct 53a fluidly connected to the mixer device 25 for mixing with the waste water W also supplied thereto. The mixer device 25 can also be connected via fluidly connected duct 9b to the particulate collector 9 so that at least a portion of the collected solids P separated by the particulate collector 9 can be fed to the mixer device 25.

The mixer device 25 can receive the alkaline reagent R from alkaline reagent source 51 via duct 51b, the solids P from the particulate collector 9 via duct 9b, the activated carbon or activated coke AC from the activated carbon or activated coke AC source 53 via duct 53a, and the liquid waste water W from waste water holding tank 19 via pipe 23. The mixer device 25 can agitate or otherwise mix these elements to combine the elements to form a mixture M. The mixture formed by the mixer device 25 can be formed as a moist powder, e.g., a wet dust or a moist dust, or a slurry. When formed as a moist powder, the mixture M may have a water content of at least 1% water by weight or, a content of between 2% and 5% water by weight. It is also contemplated that embodiments may be configured so that the mixer device 25 forms a mixture M having between 1% and 8% water by weight. In yet other embodiments, it is contemplated that the mixer device 25 could be configured to form a moist powder having a water content that ranges from 1% water by weight to a content value that is over 8% water by weight.

The mixture M formed within the mixer device 25 can subsequently be output from the mixer device 25 via duct 27. At least one mixture M distribution duct 27 fluidly connects the mixer device 25 to the bypass conduit 6 to feed the mixture M to the flue gas FG flowing through the bypass conduit 6. One or more nozzles or other dispersion mechanisms 27a may be used to disperse or spray the mixture M within the bypass conduit 6 to feed the mixture M to the flue gas FG. The mixture distribution duct 27 can be configured so that the mixture M formed by the mixer device 25 is dispersible within one discrete location of the bypass conduit 6 or is dispersible at multiple different spaced apart locations in the bypass conduit 6 for contact with the flue gas FG passing through the bypass conduit 6. The flue gas FG and mixture M can subsequently pass through the remaining portion of bypass conduit 6 for flow into evaporator device 7 and subsequently combined via duct 8 with the flue gas FG flowing out of the pre-heater 5 via duct 5a. Alternative embodiments of the system 12 can be configured to allow any waste water W streams or solids P from the particulate collector 9 to be added separately into the bypass conduit 6 or into evaporator device 7.

It is contemplated that the flue gas FG and the mixture M from the mixer device 25 remain within the evaporator device 7 for a pre-specified residence time to ensure the waste water W from the mixture M is sufficiently evaporated, the flue gas FG is cooled to a pre-specified temperature and solid particulates sufficiently dried to a pre-specified degree of dryness for vertical flow through duct 8 into particulate collector 9. Alternatively, a separate particulate collector 90 can be configured downstream of the evaporator device 7 for separate and segregated particulate SP capture and disposal via duct 90a. In this scenario, a fan 31 may be included following particulate collector 90 with flue gas flowing therefrom in duct 8 combined with flue gas flowing through duct 5a. Use of the relatively hot flue gas FG from upstream of pre-heater 5 has an additional advantage in that the flue gas FG pressure from this upstream location is higher than the flue gas FG pressure downstream of the pre-heater 5. Higher flue gas FG pressure can facilitate a natural circulation of the flue gas FG passed through duct 6 for flow into the evaporator device 7 and out of evaporator device 7 via fluidly connected duct 8. Such natural circulation is beneficial as thereby a pump or fan 31 is not needed for powering the flow of flue gas FG to or from the evaporator device 7. Of course, a pump or fan 31 can be utilized in duct 8 of such systems 12 as a back-up measure or to ensure control of flue gas FG flow rate is maintainable within a desired flow rate range. When a pump or fan 31 is used in such systems 12, the pump or fan may be able to operate at lower power levels thereby conserving energy and associated costs due to the larger pressure drop provided by use of the relatively hotter flue gas FG.

Flue gas FG flowing out of the pre-heater 5 combines in duct 5a with flue gas FG and solid particulates flowing therein via fluidly connected duct 8. From duct 8, the combined flue gas FG and solid particulates flow into fluidly connected particulate collector 9 for separation of solids P from the flue gas FG. At least a portion of solids P separated from flue gas FG in particulate collector 9 is recycled to the mixer device 25 via fluidly connected duct 9b. Another portion of the solids P material can be output via duct 11 for subsequent treatment and distribution.

From particulate collector 9 flue gas FG flows to a wet flue gas desulfurization system 13 for desulfurization prior to "cleaned" flue gas CG flowing through fluidly connected duct 13a to fluidly connected stack 15 for release to the environment or atmosphere. Waste water W from the wet flue gas desulfurization system 13, as well as waste water W from other plant 10 waste water W sources 17 can be fed via pipes 14 and 17a, respectively, to the waste water holding tank 19 for ammonia stripping and subsequent use in the mixer device 25. In alternative embodiments, a dry flue gas desulfurization system can be utilized instead of a wet flue gas desulfurization system.

In some embodiments, it is contemplated that a portion of the mixture M formed in the mixer device 25 is transported via fluidly connected duct 25a (shown in broken line in FIG. 2) to the flue gas FG flowing through fluidly connected duct 5a after the flue gas FG has exited the pre-heater 5, such that the flue gas FG can be cooled and humidified and the solid particulates within the mixture M can be dried prior to flow into the particulate collector 9. Such an embodiment of the system 12 can be advantageous as it may provide a relatively small footprint permitting a plant 10 to be retrofitted with minimal capital costs incurred.

For instance, bypass conduit 6 may not be needed for embodiments of the system 12 that are configured so that the mixture M formed by the mixer device 25 is fed to the flue gas FG after it has exited the pre-heater 5 and before it enters particulate collector 9 via duct 5a. Further, it is contemplated that a pre-existing conduit within a plant 10 that transports flue gas FG from a pre-heater 5 to a particulate collector 9 can be utilized with minimal modification for the transport of the mixture M and flue gas FG to the particulate collector 9. The portion of this conduit that transports both the mixture M and the flue gas FG can be configured so that the mixture M has a sufficient residence time with the flue gas FG passing through that conduit to ensure the flue gas FG is sufficiently cooled and the solid particulates from the mixture M are sufficiently dried prior to entering the particulate collector 9. For example, the flue gas can be at a temperature of between about 250° F. and about 400° F., or between about 120° C. and about 205° C. after passing out of the pre-heater 5 and be subsequently further cooled upon contacting the mixture M from the mixer device 25 to a temperature of between about 180° F. and about 300° F. or between about 80° C. and about 150° C. so that the solid particulates are sufficiently dried and the flue gas FG is cooled and humidified prior to flow into the particulate collector 9.

System 12 and methods of using system 12 provide processes to reduce ammonia/ammonium ion content in waste water W prior to the waste water W being evaporated into a flue gas FG stream. As such, the processes reduce the release of ammonia into the flue gas FG stream thus reducing emissions of ammonia to the environment or atmosphere and/or accumulation in downstream equipment such as a wet flue gas desulfurization system 13. As ammonia in plant 10 flue gas FG streams is a non-desirable emission and often operating permits require operation of a plant within a certain discharge level. In practice, ammonia is commonly used in plant applications where ammonia is added upstream of an SCR for a reduction of nitrogen oxide compounds. Some excess ammonia oftentimes will pass through an SCR and pass to the downstream equipment where it may be removed to various levels depending on the equipment. In the case that a WFGD system is located downstream of the SCR, the WFGD system will remove some ammonia from the flue gas FG and the ammonia then accumulated in the aqueous WFGD slurry. Part of the WFGD system aqueous steam is normally purged as waste water W to maintain a certain internal chemistry, such as to control an approximate chloride level, any ammonia in the waste water W will leave the WFGD system largely with the purged waste water W stream. The system and method disclosed herein reduces a plant's potential to allow ammonia to be released into the flue gas FG and into the environment. As such, the subject system and method allows for plant use of evaporation systems for waste water W streams without contacting ammonia/ammonium ions, reduces or eliminates emissions of ammonia with a flue gas FG stream caused by evaporation of waste water W containing ammonia/ammonium ion, reduces or avoids accumulation of ammonia in WFGD systems downstream of waste water W evaporation device 7, and reduces ammonia make-up supplies required for SCR or SNCR 3 systems.

It should be appreciated that various changes can be made to embodiments of the system 12 for reducing gas emissions to account for different design criteria. For instance, the size, shape or configuration of ducts for transporting different solids/fluids to and from different elements of the system 12 can be any of a number of suitable shapes, sizes, or configurations and include any of a number of different elements such as vessels, valves, pipes, tubes, tanks, or ducts that have the flow rate of fluid with or without entrained particulates affected by pumps or fans connected to or in fluid communication with such elements. The temperatures and/or pressures at which the flue gas, waste water, and other fluid flows are to be maintained at or kept can also be any of a number of suitable ranges to meet a particular set of design objectives. As another example, any type of suitable alkaline reagent R can be injected within or mixed with the waste water W to neutralize acid gases absorbed by the waste water W in the evaporator device 7.

While the subject system and method for reducing gas emissions to the environment have been described with reference to various exemplary embodiments, it will be understood by those skilled in the art that various changes can be made and equivalents can be substituted for elements thereof without departing from the intended scope. In addition, many modifications can be made to adapt a particular situation or material to the subject teachings without departing from the essential scope thereof. Therefore, it is intended that the subject system and method not be limited to the particular embodiments disclosed, but to include all embodiments falling within the scope of the appended claims.

What is claimed is:

1. A system for reducing plant gas emissions to the environment, comprising:
   a waste water holding tank containing waste water comprising ammonia/ammonium ions from a dry or wet flue gas desulfurization system for temporary storage;
   a stripping agent source operable to supply a stripping agent to the waste water in the waste water holding tank to produce a stripped ammonia gas from the waste water; and
   ductwork arranged for flow of the stripped ammonia gas to a flow upstream of a combustion unit, to the combustion unit, to a flow upstream of a nitrogen oxide removing device, or to the nitrogen oxide removing device for reaction of the stripped ammonia gas in the combustion unit or the nitrogen oxide removing device reducing environmental emission thereof.

2. The system of claim 1, wherein the flow upstream of the combustion unit is an air flow.

3. The system of claim 1, wherein the flow upstream of the nitrogen oxide removing device is a flue gas flow.

4. The system of claim 1, wherein the combustion unit is an incinerator or a boiler.

5. The system of claim 1, wherein the nitrogen oxide removing device is a selective catalytic removal device or a selective non-catalytic removal device.

6. The system of claim 1, wherein the stripping agent is steam, air or steam and air.

7. The system of claim 1, wherein the dry or wet flue gas desulfurization system is a wet flue gas desulfurization system.

8. The system of claim 1, wherein the waste water holding tank releases after stripping ammonia gas, a flow of waste water to an evaporator device for waste water evaporation.

* * * * *